United States Patent
Lai et al.

(10) Patent No.: US 9,721,307 B2
(45) Date of Patent: Aug. 1, 2017

(54) IDENTIFYING ENTITIES BASED ON FREE TEXT IN MEMBER RECORDS

(71) Applicant: LinkedIn Corporation, Mountain View, CA (US)

(72) Inventors: Alex C. Lai, Menlo Park, CA (US); Ke Wang, Santa Clara, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 17 days.

(21) Appl. No.: 13/922,874

(22) Filed: Jun. 20, 2013

(65) Prior Publication Data

US 2014/0379741 A1 Dec. 25, 2014

(51) Int. Cl.
*G06F 17/30* (2006.01)
*G06Q 50/00* (2012.01)
*G06Q 10/10* (2012.01)

(52) U.S. Cl.
CPC .......... *G06Q 50/01* (2013.01); *G06Q 10/101* (2013.01); *G06F 17/30283* (2013.01)

(58) Field of Classification Search
CPC ............. G06F 17/30598; G06F 17/30241
See application file for complete search history.

(56) References Cited

U.S. PATENT DOCUMENTS

| 8,595,167 | B1 * | 11/2013 | Grieve | G06Q 50/01 706/45 |
| 9,171,338 | B2 * | 10/2015 | Chrapko | G06Q 30/02 |
| 9,202,233 | B1 * | 12/2015 | Siegel | G06Q 30/0252 |
| 2005/0080655 | A1 * | 4/2005 | Sengir | G06Q 10/0633 705/7.27 |
| 2007/0094264 | A1 * | 4/2007 | Nair | 707/9 |
| 2007/0106780 | A1 * | 5/2007 | Farnham et al. | 709/223 |
| 2008/0140650 | A1 * | 6/2008 | Stackpole | 707/5 |
| 2010/0169343 | A1 * | 7/2010 | Kenedy | G06F 17/30867 707/758 |
| 2012/0124134 | A1 * | 5/2012 | Dey | G06Q 50/01 709/204 |
| 2012/0185478 | A1 * | 7/2012 | Topham et al. | 707/737 |
| 2012/0226701 | A1 * | 9/2012 | Singh | 707/748 |
| 2012/0239494 | A1 * | 9/2012 | Hu et al. | 705/14.49 |
| 2013/0007049 | A1 * | 1/2013 | Ziemann | 707/769 |
| 2013/0239185 | A1 * | 9/2013 | Orttung | G06F 21/00 726/5 |
| 2013/0311470 | A1 * | 11/2013 | Lotfi | 707/737 |

OTHER PUBLICATIONS

House et al. SNA—Why Visually Analyse? http://web.archive.org/web/20121212033117/http://martinhouseconsulting.wordpress.com/social-network-analysis-sna/sna-why-visually-analyse-information/.*

* cited by examiner

*Primary Examiner* — Matthew Ellis
(74) *Attorney, Agent, or Firm* — Park, Vaughan, Fleming & Dowler LLP

(57) ABSTRACT

The disclosed embodiments relate to a system for identifying entities (such as companies) that are associated with members of an online social network. During operation, the system obtains text strings from member records in the online social network, wherein each text string is an identifier for an entity that is associated with a member. The system also obtains connection information specifying connections among members of the online social network, and possibly location information for the members. Finally, the system uses the text strings, the connection information and the location information to identify entities that are associated with members of the online social network.

20 Claims, 4 Drawing Sheets

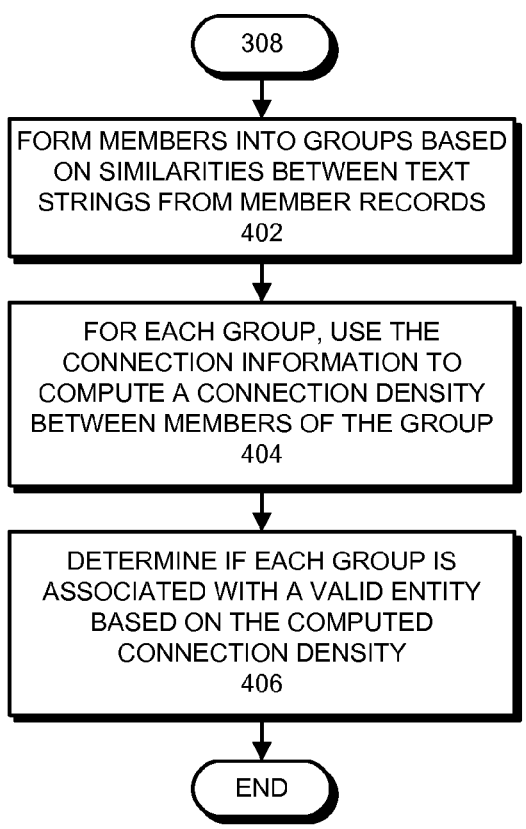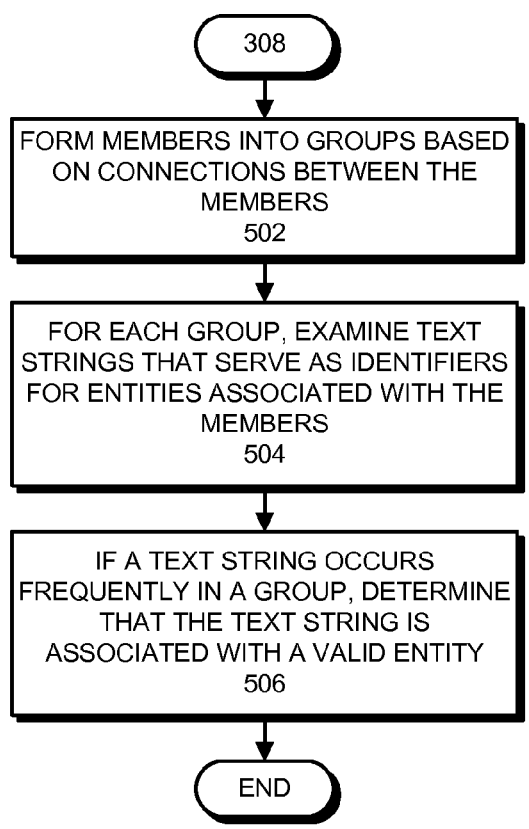
FIG. 4
FIG. 5

IDENTIFYING ENTITIES BASED ON FREE TEXT IN MEMBER RECORDS

RELATED ART

The disclosed embodiments generally relate to techniques for organizing data in online professional networks. More specifically, the disclosed embodiments relate to a system that identifies entities with which members are associated, such as companies or associations, based on free text that specifies an entity name and other information from member records.

BACKGROUND

Perhaps the most significant development on the Internet in recent years has been the rapid proliferation of online social networks, such as LinkedIn® and Facebook®. Billions of users are presently accessing such social networks to connect with friends and acquaintances and to share personal and professional information. Each member in an online social network typically maintains a profile page, which contains various information about the member, such as the member's interests, marital status, employer and school affiliations.

While organizing this profile information, it is useful to be able to associate members with specific entities, such as the company for which a member works, or a club to which a member belongs. Unfortunately, this entity information typically appears as free text strings in the member records, and because of spelling variations for entity names, it can be hard to associate these text strings with specific entities. For example, it may be hard to determine whether the text string "Acme Corporation" and the text string "Acme, Inc." actually refer to the same company. Also, the same entity name in different member records may refer to different organizations. For example, the entity name "Alice's Restaurant" may refer to a restaurant in Woodside, Calif., or a different restaurant with the same name in Jefferson, N.J.

Hence, it can be challenging to identify entities associated with free text strings in member records.

BRIEF DESCRIPTION OF THE FIGURES

FIG. 4 presents a flow chart illustrating how text strings can be used to form member groups that are used to identify entities in accordance with the disclosed embodiments.

FIG. 5 presents a flow chart illustrating how connection information can be used to form member groups that are used to identify entities in accordance with the disclosed embodiments.

DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a system reads and executes the code and/or data stored on the non-transitory computer-readable storage medium, the system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments relate to a system for identifying entities (such as companies) that are associated with members of an online social network. During operation, the system obtains text strings from member records in the online social network, wherein each text string is an identifier for an entity that is associated with a member. The system also obtains connection information specifying connections among members of the online social network, and possibly location information for the members. Finally, the system uses the text strings, the connection information and the location information to identify entities that are associated with members of the online social network.

The above-described technique is described in more detail below, but first we describe an exemplary system that performs the technique.

Computing Environment

Figure 1:
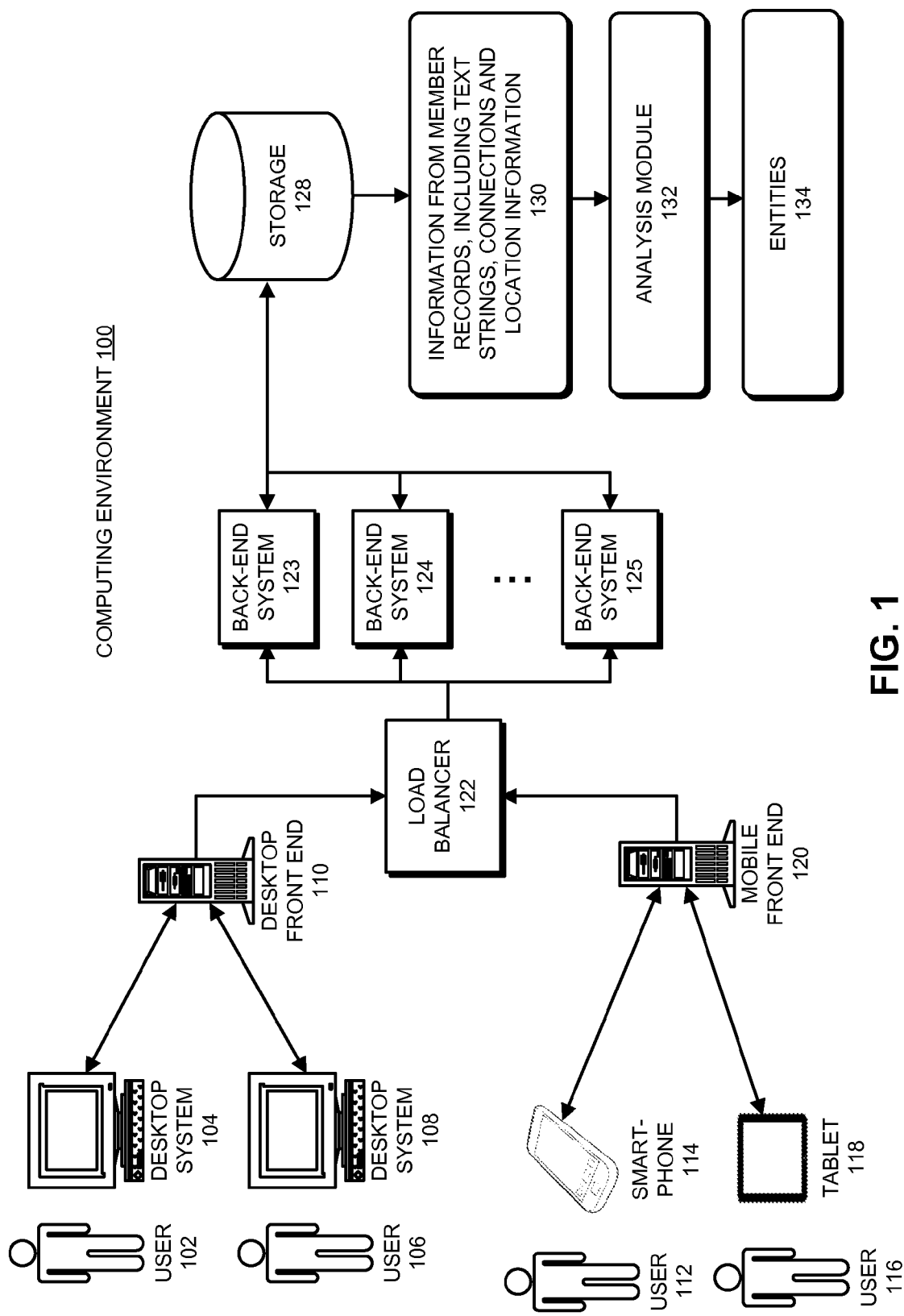
FIG. 1 illustrates a computing environment in accordance with the disclosed embodiments.

FIG. 1 illustrates an exemplary computing environment 100 for a specific type of online social network called an "online professional network" (such as LinkedIn™) which is structured to facilitate professional contacts for business purposes. As illustrated in FIG. 1, the online professional network can be accessed through browsers in desktop systems (104 and 108) that interact with a website for the online professional network. Alternatively, the online professional network can be accessed through mobile applications that act as gateways to an online professional network from associated mobile devices, including a smartphone 114 and a tablet computer 118.

More specifically, desktop systems 104 and 108 include browsers (not shown) which are operated by users 102 and 106, respectively. Desktop systems 104 and 108 can generally include any type of computer system that can interact with the online professional network through a browser. For example, desktop systems 104 and 108 can include a personal computer system, a server computer system, or even a laptop computer system. During operation, browsers in desktop system 104 and 108 interact with a desktop front end 110, wherein desktop front end 110 provides services that make requests to various back-end systems 123-125 as is described in more detail below. Although only one desktop front end 110 is illustrated in FIG. 1, in general computing environment 100 can include a large number of desktop front ends. This enables the online professional network to simultaneously interact with thousands or even millions of users.

Mobile devices 114 and 118, which are operated by users 112 and 116, respectively, can generally include any type of portable electronic device that can interact with the online professional network through a mobile application. For example, these portable electronic devices can include a smartphone, a tablet computer, a network-connected music player, a gaming console and possibly a laptop computer system.

As mentioned above, mobile devices 114 and 118 execute mobile applications that function as portals to the online professional network. Although the illustrated embodiment shows only two mobile devices 114 and 118, in general computing environment 100 can include a large number of mobile devices and associated mobile application instances (possibly thousands or millions) that simultaneously access the online professional network.

These mobile applications interact with the online professional network through mobile front end 120, wherein mobile front end 120 includes services that make requests to various back-end systems 123-125 as is described in more detail below. Computing environment 100 can generally include a large number of mobile front-end systems, and is not limited to a single mobile front-end system 120 as is illustrated in FIG. 1. Moreover, mobile devices 114 and 118 communicate with mobile front end 120 through one or more networks (not shown), such as a Wi-Fi® network, a Bluetooth™ network or a cellular data network.

During operation, users 102 and 106 of desktop systems 104 and 108, respectively, perform various actions while interacting with the online professional network through a browser-based interface. For example, these actions can include: downloading the user's home page, sending an email message to another user, editing the user's personal profile page, or searching for a specific user. These actions cause services in desktop front end 110 to generate requests, which are sent to back-end systems 123-125 through load balancer 122.

Similarly, users 112 and 116 of portable electronic devices 114 and 118, respectively, perform various actions while interacting with the online professional network through associated mobile applications. These actions cause services in mobile front end 120 to generate requests, which are sent to back-end systems 123-125 through load balancer 122.

Requests from desktop front end 110 and mobile front end 120 are sent to load balancer 122, which decides which back-end system will receive each request. This decision can be based on a number of factors, including the load on each back-end system 123-125 and the priority of each request relative to other requests. For example, if a particular back-end system 123 is lightly loaded and other back-end systems 124 and 125 are more heavily loaded, load balancer 122 can decide to send the next request to back-end system 123.

The relative priority of requests can also affect how load balancer 122 directs requests. Some requests are relatively low priority, such as requests associated with background tasks that perform data-mining operations, whereas other requests are higher priority, such as a request to load a home page for a waiting user. Load balancer 122 can direct higher priority tasks to lightly loaded back-end systems, and can ensure that these back-end systems, which are running the higher priority tasks, remain lightly loaded. Conversely, load balancer 122 can direct lower-priority tasks to more highly loaded back-end systems, which are processing other lower-priority tasks.

During operation, back-end systems 123-125 service requests received from load balancer 122, which can involve reading from and writing to non-volatile storage device 128, such as disk drives or solid-state storage.

During operation, the illustrated system runs an analysis module 132 to identify entities (such as companies) with which members of an online social network are associated. More specifically, the system retrieves information from member records 130 from storage device 128. This information 130 includes: (1) text strings from member records that act as identifiers for an entity with which a member is associated; (2) connection information specifying connections among members of the online social network; and (3) location information for members of the online social network.

This information feeds into analysis module 132, which uses the text strings, the connection information and the location information to identify entities 134 with which members of the online social network are associated.

Note that analysis module 132 can generally use any type of data from member records or other types of records maintained by the online professional network to identify entities, and is not limited to using text strings, connections and location information. For example, analysis module 132 can possibly examine the professions or educational credentials in the member records to help in determining whether the group of members belongs to the same professional society. Analysis module 132 can additionally examine second-degree connections or third-degree connections to determine whether a group of members is associated with the same entity.

Member Information

Figure 2:
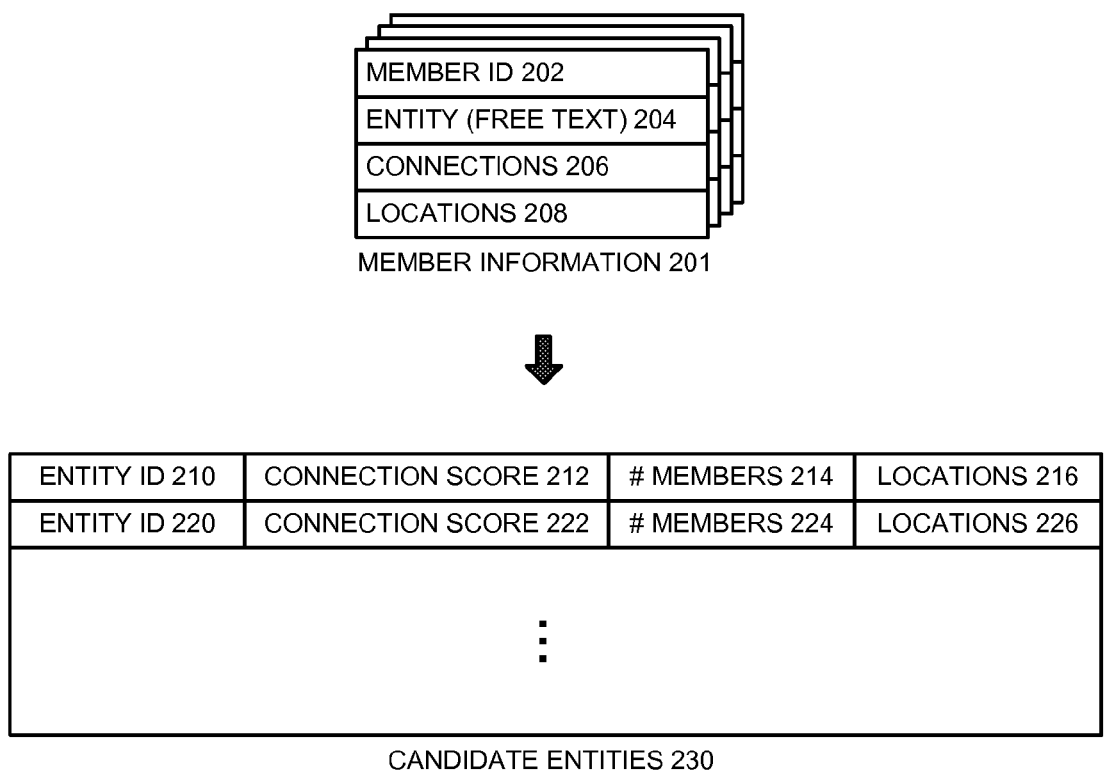
FIG. 2 illustrates how member information can be used to identify entities in accordance with the disclosed embodiments.

FIG. 2 illustrates how member information 201 can be used to identify entities in accordance with the disclosed embodiments. For each member, member information 201 can include: (1) a member identifier (ID) 202, which can include the name of the member and/or a numerical identifier for the member; (2) an entity 204 (such as a current company for which the member works), which can be specified as a free text string; (3) connections 206 of the member; and (4) one or more locations 208 where the member works or resides.

This information is processed by analysis module 132 to produce a set of candidate entities 230, wherein for each candidate entity, the system maintains: (1) an entity identifier 210 such as a text string and/or a numerical identifier; (2) a connection score 212 indicating a connection density among members associated with the entity; (3) the number of members 214 in the entity; and (4) one or more locations 216 for the entity, and possibly a listing of how many members are associated with each location. The system can then select valid entities from the set of candidate entities 230 based on different criteria.

This entire process is described in more detail below with reference to FIGS. 3 and 4.

Process of Identifying Entities

Figure 3:
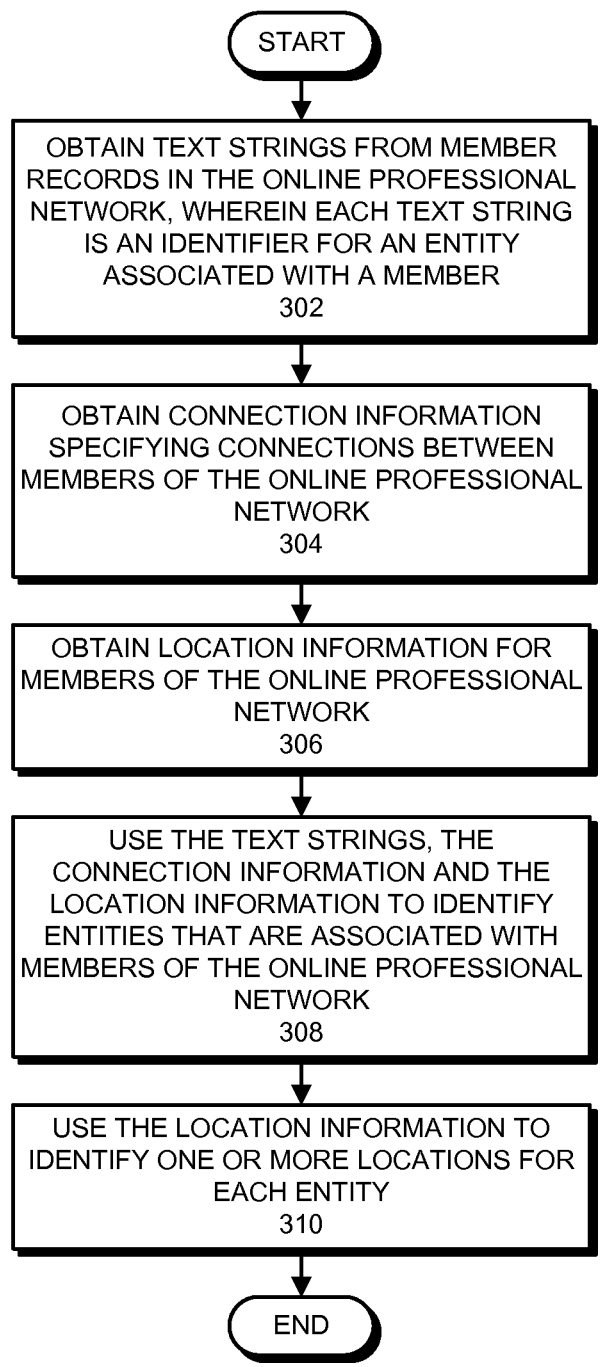
FIG. 3 presents a flow chart illustrating how text strings, connection information and location information can be used to identify entities in accordance with the disclosed embodiments.

FIG. 3 presents a flow chart illustrating how text strings, connection information and location information can be used to identify entities in accordance with the disclosed embodiments. During this process, the system obtains text strings from member records in the online professional network (step 302), wherein each text string is an identifier for an entity with which a member is associated. Note that a member can possibly be associated with more than one entity. For example, a member can work for a first company, can be on the board of a second company and can be a member of a sports club. In this case, the member is associated with three entities, namely the first company, the second company and the sports club. Also, note that the system can preprocess these text strings by eliding certain characters or substrings. For example, the system can elide punctuation marks, such as commas, dashes and colons, or strings that commonly occur in company names, such as "inc.", "ltd.", or "corp."

The system also obtains connection information specifying connections among members of the online professional network (step 304), and location information for members of the online professional network (step 306). Note that the connection information and location can be obtained directly from member records. Alternatively, the connection information can be obtained from data structures in the online professional network that keep track of connections, and the location information can be obtained from a GPS transceiver in the computing device.

Next, the system uses the text strings, the connection information and the location information to identify entities with which members of the online professional network are associated (step 308). (This process is described in more detail below with reference to FIGS. 4 and 5.)

Finally, the system uses the location information to identify one or more locations for the entity (step 310). For example, the system can use work addresses obtained from member records to determine the locations of one or more offices for a company. The system can also determine how many members work at each office.

After an entity is identified, the system can also create a page in the online professional network for the entity (such as a company page), which includes: an identifier for the entity, a description of the entity, and one or more locations for the entity.

Using Text Strings to Form Groups

FIG. 4 presents a flow chart illustrating how text strings can be used to form member groups that are used to identify entities in accordance with the disclosed embodiments. At the start of this process, the system forms members into entity groups based on similarities among text strings from member records (step 402). This can be accomplished in a number of different ways. For example, similarities among text strings can be measured using the Levenshtein edit distance metric. (See Wagner, Robert A.; Fischer, Michael J. (1974), "The String-to-String Correction Problem," *Journal of the ACM* 21 (1): 168-173.)

Moreover, various heuristics can be used to form groups based on the edit distance. For example, the system can identify all pairs of strings that fall within a given edit distance of each other. Then, the system can combine the identified pairs into triples if the three strings in a triple all fall within the given edit distance of a selected "anchor string" in the triple. This process can be repeated for quadruples, quintuples, and so on up to a predetermined limit. Next, the system compares each member's text string with the text strings for the groups to determine whether the member belongs to a group. If so, the system adds the member's ID to an array for the group.

Next, for each group that is associated with a text string, the system uses the connection information to compute a connection density among members of the group (step 404). This can be accomplished in a number of ways. For example, one technique involves forming a "connection array" for the $n^2$ possible connection pairs for a group of size n. For each pair, the system looks at the connection data to determine whether the members are connected. If so, the system sets the corresponding entry in the connection array to one. Otherwise, the system sets the entry to zero. The system then computes the connection density by summing up all of the entries in the connection array, and then normalizes the sum by dividing by $n^2$.

Finally, the system determines if each group is associated with a valid entity based on the computed connection density (step 406). This can be accomplished in a number of different ways. For example, the system can compare the connection density against a fixed threshold value.

Alternatively, the system can use a supervised-learning technique to determine an appropriate threshold value for each group size. Note that this supervised-learning technique can involve manually verifying for each group whether the group is associated with a valid entity, and then establishing group-size-specific thresholds for the connection densities based on the results of the manual verifications.

Note that location information can also be used to help determine if a group is a valid entity. For example, if most of the members of a group work or reside in the same city or metropolitan area, it is considerably more likely that the group is a valid entity.

Using Connections to Form Groups

FIG. 5 presents a flow chart illustrating how connection information can be used to form member groups that are used to identify entities in accordance with the disclosed embodiments. At the start of this process, the system forms members into groups based on connections among the members (step 502). Next, for each group, the system examines text strings that serve as identifiers for entities with which the members are associated (step 504). Finally, if a given text string occurs frequently in a group, the system determines that the given text string is associated with a valid entity (step 506).

For example, for a given member, the system can put all of the member's first-degree connections into an array, with one row for each first-degree connection. Note that each row includes all the connections for the member associated with the row, so the width of the array is not fixed. The system associates each of the connections with a text string that identifies an entity, and the system then determines what percentage of the connections is associated with the same or similar text string as the given member. The system then computes the average percentage across all connections for the member. Finally, the system compares the average percentage with a threshold to determine if the text string is associated with a valid entity.

The foregoing descriptions of disclosed embodiments have been presented only for purposes of illustration and description. They are not intended to be exhaustive or to limit the disclosed embodiments to the forms disclosed. Accordingly, many modifications and variations will be apparent to practitioners skilled in the art. Additionally, the above disclosure is not intended to limit the disclosed embodiments. The scope of the disclosed embodiments is defined by the appended claims.

What is claimed is:

1. A computer-implemented method for identifying entities with which members of an online social network are associated, the method comprising:
    obtaining text strings from member records in the online social network, wherein each member record identifies professional characteristics of a corresponding member of the online social network;
    obtaining social connection information specifying social connections between the members of the online social network; and
    for each of one or more entities identified from the text strings:
        identifying within the online social network a group of members associated with the entity;
        identifying, from member records of the group of members, one or more locations of the entity;
        calculating a connection density among the group of members, based on the social connection information by:
            for each of n members of the group, adding 1 to a density value for each other member of the group with which the member is connected; and
            dividing the density value by $n^2$ to yield the connection density; and
        determining whether the entity is a valid entity.

2. The computer-implemented method of claim 1, further comprising:
    obtaining location information for members of the online social network; and
    identifying the one or more entities based at least in part on the location information for the members.

3. The computer-implemented method of claim 1, wherein an entity with which a member is associated can include:
    an organization for which the member works;
    a club to which the member belongs;
    an association to which the member belongs; and
    a government organization with which the member is associated.

4. The computer-implemented method of claim 1, wherein:
    calculating the connection density for the group of members further comprises generating a social connection data structure;
    the social connection data structure stores a bit for all of the possible connection pairs between the n members; and
    each bit indicates whether an associated pair of members is connected in the online social network.

5. The computer-implemented method of claim 1, wherein the online social network is an online professional network.

6. The computer-implemented method of claim 1, further comprising, when the entity is determined to be a valid entity:
    creating within the online social network a page for the entity, wherein the page includes:
        an identifier for the entity,
        a description of the entity, and
        the one or more locations for the entity.

7. The method of claim 1, wherein said identifying the group of members associated with the entity comprises:
    selecting among the text strings an anchor string corresponding to the entity;
    identifying additional strings corresponding to the entity, other than the anchor string, to yield multiple strings that include the anchor string and the additional strings; and
    identifying members whose records include the multiple strings within a specified edit distance.

8. The method of claim 1, further comprising identifying a percentage of member connections associated with the entity by:
    for each member associated with the entity, identifying a percentage of the member's connections that are also associated with the entity; and
    calculating, among the members associated with the entity, an average percentage of members' connections that are associated with the entity.

9. The method of claim 8, wherein determining whether a given entity is a valid entity comprises one or more of:
    comparing the connection density calculated for the given entity to a threshold value;
    determining from the member records whether a majority of the members of the group associated with the given entity are associated with a single area; and
    comparing the average percentage of members' connections that are associated with the given entity with a threshold.

10. The method of claim 1, wherein the social connection information for a given member includes:
    first degree connections of the given member within the online social network; and
    second degree connections of the given member within the online social network.

11. A non-transitory computer-readable storage medium storing instructions that when executed by a computer cause the computer to perform a method for identifying entities with which members of an online social network are associated, the method comprising:
    obtaining text strings from member records in the online social network, wherein each member record identifies professional characteristics of a corresponding member of the online social network;
    obtaining social connection information specifying social connections between the members of the online social network; and
    for each of one or more entities identified from the text strings:
        identifying within the online social network a group of members associated with the entity;
        identifying, from member records of the group of members, one or more locations of the entity;
        calculating a connection density among the group of members, based on the social connection information by:
            for each of n members of the group, adding 1 to a density value for each other member of the group with which the member is connected; and
            dividing the density value by $n^2$ to yield the connection density; and
        determining whether the entity is a valid entity.

12. The non-transitory computer-readable storage medium of claim 11, wherein the method further comprises:
    obtaining location information for members of the online social network; and
    identifying the one or more entities based at least in part on the location information for the members.

13. The non-transitory computer-readable storage medium of claim 11, wherein an entity with which a member is associated can include:
   an organization for which the member works;
   a club to which the member belongs;
   an association to which the member belongs; and
   a government organization with which the member is associated.

14. The non-transitory computer-readable storage medium of claim 11, wherein:
   calculating the connection density for the group of members further comprises generating a social connection data structure;
   the social connection data structure stores a bit for all of the possible connection pairs between the n members; and
   each bit indicates whether an associated pair of members is connected in the online social network.

15. The non-transitory computer-readable storage medium of claim 11, wherein the online social network is an online professional network.

16. The non-transitory computer-readable storage medium of claim 11, wherein the method further comprises, when the entity is determined to be a valid entity:
   creating within the online social network a page for the entity, wherein the page includes:
      an identifier for the entity,
      a description of the entity, and
      the one or more locations for the entity.

17. A system that identifies entities with which members of an online social network are associated, comprising:
   a computing system including a processor and a memory;
   wherein the computing system is configured to run an online social network; and
   wherein the online social network is configured to:
      obtain text strings from member records in the online social network, wherein each member record identifies professional characteristics of a corresponding member of the online social network;
      obtain social connection information specifying social connections between the members of the online social network; and
      for each of one or more entities identified from the text strings:
         identify within the online social network a group of members associated with the entity;
         identify, from member records of the group of members, one or more locations of the entity;
         calculate a connection density among the group of members, based on the social connection information by:
            for each of n members of the group, adding 1 to a density value for each other member of the group with which the member is connected; and
            dividing the density value by $n^2$ to yield the connection density; and
         determine whether the entity is a valid entity.

18. The system of claim 17, wherein the online social network is additionally configured to:
   obtain location information for members of the online social network; and
   identify the entities based at least in part on the location information for the members.

19. The system of claim 17, wherein:
   calculating the connection density for the group of members further comprises generating a social connection data structure;
   the social connection data structure stores a bit for all of the possible connection pairs between the n members; and
   each bit indicates whether an associated pair of members is connected in the online social network.

20. The system of claim 17, wherein the social connection information for a given member includes:
   first degree connections of the given member within the online social network; and
   second degree connections of the given member within the online social network.

* * * * *